Oct. 20, 1970 A. S. MILLER 3,535,469

MASKED ELECTROLUMINESCENT DIODE AND FILM RECORDING DEVICE UTILIZING THE SAME

Filed May 27, 1968 2 Sheets-Sheet 1

United States Patent Office 3,535,469
Patented Oct. 20, 1970

3,535,469

MASKED ELECTROLUMINESCENT DIODE AND FILM RECORDING DEVICE UTILIZING THE SAME

Allan S. Miller, Wellesley, Mass., assignor to North Research Corporation, Cambridge, Mass., a corporation of Massachusetts Continuation-in-part of application Ser. No. 639,864, May 19, 1967. This application May 27, 1968, Ser. No. 732,202
Int. Cl. G01d *9/42;* G11b *7/12;* H05b *33/16*
U.S. Cl. 179—100.3 6 Claims

ABSTRACT OF THE DISCLOSURE

An electroluminescent diode, such as a silicon carbide diode, preferably has one edge ground so that it makes an acute angle to the plane of the junction. This edge is covered with a light barrier and then ground normal to the plane at the junction until the portion of the light barrier immediately adjacent the p-n junction is removed. Accordingly, some of the light which would normally escape from the edge is prevented from doing so and the effective width of the light emitted from the junction is considerably narrower than would be the case if the light barrier were not present. When the edge of the junction is held in close proximity to motion picture film, it can be utilized for recording sound on the film in a sound motion picture camera.

This application is a continuation-in-part of my copending application Ser. No. 639,864, filed May 19, 1967.

The present invention is particularly directed to an improved electroluminescent junction diode, particularly a silicon carbide diode which is useful for recording a high density of data on a photographic film, such as a sound track on a motion picture film.

The principal object of the present invention is to provide an improved electroluminescent junction diode having a very narrow emitted beam of light.

These and other objects of the invention will be obvious and will in part appear hereinafter.

For a fuller understanding of the nature and objects of the invention, reference should be had to the following detailed discussion thereof taken in connection with the accompanying drawings in which FIG. 1 is a diagrammatic, schematic representation of a silicon carbide diode partially modified in accordance with the present invention;

SUMMARY OF THE INVENTION

The invention is particularly concerned with an improved electroluminescent junction diode, such as a silicon carbide diode, having a beam of emitted light which is particularly useful for recording high density of data on photographic film, for example, for recording a sound track on motion picture film. For convenience the invention is initially described in connection with the use of the preferred silicon carbide junction diode. One side of the junction is relatively opaque to light generated at the junction and the other side is relatively transparent to such light, at least in the region of the junction. The relatively transparent side of the diode is machined so as to remove a part of the relatively transparent region to provide a part of the remaining transparent portion adjacent the p-n junction which is no more than about .001 inch thick as measured normal to the junction. This is preferably accomplished by grinding to provide a surface on the transparent region which is generally at an angle with respect to the plane of the junction. The whole face of the diode is then covered with a light barrier so that light generated in the junction is substantially absorbed whereever the relatively opaque barrier exists. The pointed edge of the diode is then ground approximately normal to the plane of the junction until the barrier on the opaque side of the diode is removed and a very small portion of the barrier on the transparent side of the diode immediately adjacent the junction is also removed. This provides a very narrow window through which the light can escape from the diode. This window is preferably less than about 1 mil ($1 \times 10^{-3}$ inch) thick.

Figure 1:
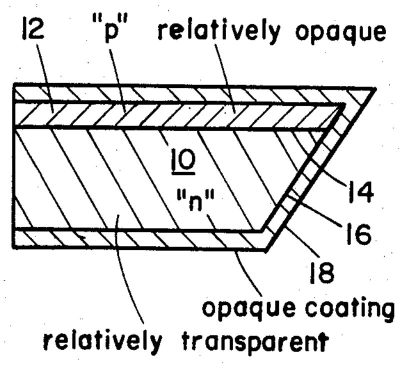

In order that the invention may be more fully understood, reference should be had to the highly diagrammatic, schematic representation shown in FIG. 1. In this drawing, the junction diode is shown as comprising an n-type crystal 10 which is relatively transparent and is superimposed on a p-type material 12, the composite structure being in the form of a single crystal and having a junction which is indicated at 14. In a preferred embodiment of the invention, the relatively transparent n-type material has an adsorption coefficient less than 100 cm.$^{-1}$, and the relatively opaque p-type material has an adsorption coefficient greater than 200 cm.$^{-1}$. Normally, such a crystal will have a face which is perpendicular to the plane of the junction, this being the normal cleavage, cutting or sawing line. However, the light-transmitting face is ground as at 16, thereby making an appreciable angle to the normal. This face 16 is then covered with an opaque coating 18 which prevents escape of light from the junction. This opaque coating may be an opaque organic coating such as an epoxy resin, or it can be a metallic coating (e.g., gold) which can also be a contact to the diode.

Figures 2, 3:
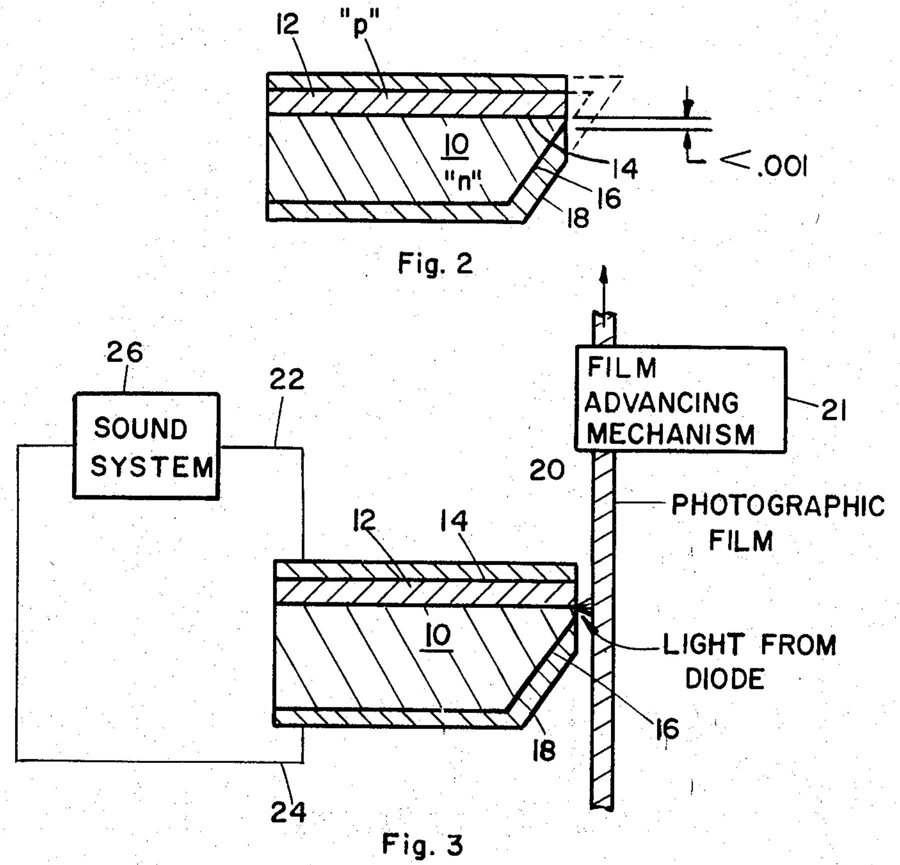
FIG. 2 is a diagrammatic representation of a section of the crystal of FIG. 1 after grinding the tapered edge to remove a portion of the barrier immediately adjacent the junction.
FIG. 3 is a schematic, diagrammatic representation of the diode as used in conjunction with a sound motion picture camera.

Referring now to FIG. 2, there is illustrated how the pointed tip at the diode is ground away, preferably normal to the plane of the junction. This grinding is terminated as soon as a very small portion of opaque coating immediately adjacent the junction 14 has been removed. There is thus formed a very narrow transparent window at the junction through which light can escape, the light being stopped on one side by the opaque layer 12 and on the other side by the unremoved opaque coating 18. In FIG. 3 the photographic film is shown at 20 as being advanced by a constant speed film advancing mechanism 21 past the light-transmitting edge 18 of the diode described in FIG. 1. Suitable leads 22 and 24 connect the diode to a sound system 26 which provides a sound-modulated electrical current for varying the light output from the diode.

In a preferred embodiment of the invention, the diode is prepared in accordance with the following nonlimiting examples:

EXAMPLE 1

A silicon carbide "n" crystal having a p-n junction produced in accordance with Example 1 of the copending application of Miller and Vitkus (Ser. No. 556,408, filed June 7, 1966) was further treated as set forth below.

The crystal was contacted on both top and bottom with a pure silver contact using $TiH_2$ as a flux in a helium atmosphere at 1000° C. The crystal was then supported with the junction at an angle of about 45° with respect to the horizontal and potted in an epoxy resin while at this angle. Then the edge 16 was ground so that it made an angle of about 45° with respect to the junction as measured through the relatively transparent "n" section. The face 16 was next covered with an opaque coating of opaque epoxy and was then ground as shown in FIG. 2. A preferred epoxy is BiPax BB 3104, sold by Tra-Con of Medford, Mass. During the grinding the operation was closely observed so that as soon as light escaped from the uncovered edge adjacent the junction the grinding was terminated. In this way a "window" only approximately .5 to $1.0\times10^{-3}$ inch wide was obtained. The finished diode was then mounted on a 16 mm. motion picture camera as shown in FIG.3.

EXAMPLE 2

Figure 4:
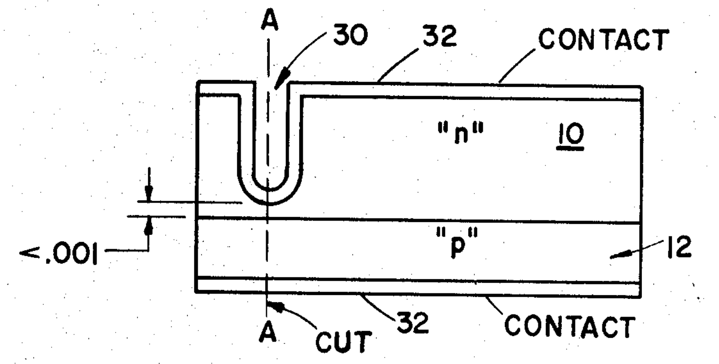
FIG. 4 is a diagrammatic representation of a section of a silicon carbide junction diode during production in accordance with another modification of the invention.

Referring now to FIG. 4, there is shown another method of making a diode having a very narrow light emitting window at one edge of the p–n junction. In this case a crystal of the type described in Example 1 was shaped in the fashion shown in FIG. 4 wherein a deep cut 30 was made in the "n" layer 10, the bottom of this cut extending to within less than .001″ of the p–n junction. Thereafter the cut surface 30 was provided with an opaque coating 32 which was a layer of silver. This silver layer was provided on both surfaces, the silver being thick enough to provide an electrode as well as an opaque coating. Thereafter the diode was contacted and potted in a suitable epoxy. The diode edge was then ground down to the line A—A thus providing a very narrow window between the bottom of the cut 30 and the p–n junction.

EXAMPLE 3

Figure 5:
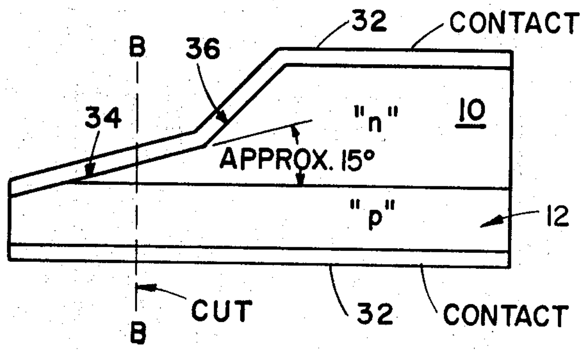
FIG. 5 is a diagrammatic representation of a section of a silicon carbide junction diode during production in accordance with still another modification of the invention.

In this case a diode of the type described in Example 1 is ground as shown in FIG. 5 so as to provide two angular faces, 34 and 36, the first (34) being a shallow face which extends completely through the p–n junction from the n region to the p region. It preferably makes an angle between 10° and 20° with respect to the p–n junction, a convenient angle being about 15°. The second face (36) may conveniently be at an angle of 45° or more with respect to the junction. In this case the edge of the diode, after contacting and potting, is ground away to the line B—B. During the grinding, the electrical resistance of the diode may be monitored continuously. This resistance is initially quite low since the current passes only through the p region due to the fact that the upper contact 32. initially, is on the p region as well as on the n region. As the grinding proceeds back to the point where the shallow face 34 intersects the p–n junction the resistance will increase substantially due to the barrier effect of the junction. Therefore, the position of the grinding operation with relation to the p–n junction can be accurately determined without removing the diode from the grinding equipment. Since the angle 34 is very shallow (e.g., 15°) the size of the window at the p–n junction can be very accurately ontrolled since a 1 mil depth of grind will increase the size of the window by only about ¼ mil.

While several specific techniques have been described for forming diodes for the purpose of the present invention, it will be apparent that various machining operations other than those specifically enumerated can be employed. For example there may be used chemical etching techniques, electron beam machining and other technology employed in the semiconductor device industry and such techniques are intended to be included in the expression "machining."

Since certain changes can be made in the above process, apparatus and product without departing from the scope of the invention herein involved, it is intended that all matter contained in the above description shall be interpreted as illustrative and not in a limiting sense.

What is claimed is:

1. An electroluminescent diode having "p" and "n" regions in a single crystal to form a light-emitting p–n junction along a plane, one of said regions being substantially transparent to light generated in the vicinity of the junction and the other of said regions being substantially opaque to such light, the transparent region being shaped to provide a surface which generally extends at an acute angle to the plane of the junction, the edge of the transparent region immediately adjacent the junction being substantially normal to the junction, the surface making the acute angle having a light barrier whereby light is emitted from said diode only through said substantially normal edge of the transparent region, the width of the transparent region being less than $1\times10^{-3}$ inches.

2. The diode of claim 1 wherein the said surface makes an angle to the plane of the junction of about 10°–20° at the normal edge.

3. The diode of claim 1 wherein the transparent region has an adsorption coefficient of less than 100 cm.$^{-1}$ and the relatively opaque region has an adsorption coefficient of greater than 200 cm.$^{-1}$.

4. The diode of claim 3 wherein the light barrier comprises a metallic film.

5. The diode of claim 3 wherein the light barrier comprises an organic film.

6. A film recording device comprising means for creating relative motion between a photographic film and an electroluminescent diode having "p" and "n" regions in a single crystal to form a light-emitting p–n junction along a plane, one of said regions being substantially transparent to light generated in the vicinity of the junction and the other of said regions being substantially opaque to such light, the transparent region being shaped to provide a surface having an acute angle to the plane of the junction, the edge of the transparent region immediately adjacent the junction being substantially normal to the junction, the surface making the acute angle having a light barrier whereby light is emitted from said diode only through said substantially normal edge of the transparent region, said edge being positioned adjacent said film the width of said transparent edge, as measured in the direction of relative motion, being less than $1\times10^{-3}$ inch, and means for modulating the light emitted from said edge.

References Cited

UNITED STATES PATENTS

| | | | |
|---|---|---|---|
| 2,692,952 | 10/1954 | Briggs. | |
| 2,776,367 | 1/1957 | Lehovec. | |
| 3,330,991 | 7/1967 | Lavine et al. | 313—108 X |
| 3,333,135 | 7/1967 | Galginaitis | 313—108 |
| 3,361,678 | 1/1968 | Addamiano | 252—301.4 |
| 3,377,210 | 4/1968 | Somerville | 148—1.5 |
| 3,419,742 | 12/1968 | Herzog | 313—108 |
| 3,428,845 | 2/1969 | Nelson | 313—108 |
| 3,340,108 | 9/1967 | Vickery | 148—33 |

STANLEY M. URYNOWICZ, Jr., Primary Examiner

R. F. CARDILLO, Jr., Assistant Examiner

U.S. Cl. X.R.

313—108; 317—234; 346—107

UNITED STATES PATENT OFFICE
CERTIFICATE OF CORRECTION

Patent No. 3,535,469 October 20, 1970

Allan S. Miller

It is certified that error appears in the above identified patent and that said Letters Patent are hereby corrected as shown below:

In the heading to the printed specification, lines 5 and 6, "North Research Corporation" should read -- Norton Research Corporation --.

Signed and sealed this 6th day of April 1971.

(SEAL)
Attest:

EDWARD M.FLETCHER,JR.
Attesting Officer

WILLIAM E. SCHUYLER, JR.
Commissioner of Patents